(12) United States Patent
Abend et al.

(10) Patent No.: US 7,533,035 B1
(45) Date of Patent: May 12, 2009

(54) INNOVATION ENGINES

(75) Inventors: C. Josh Abend, 854 Fremont St., Menlo Park, CA (US) 94025; Robert O'Hagan, Santa Clara, CA (US)

(73) Assignee: C. Josh Abend, Menlo Park, CA (US)

( * ) Notice: Subject to any disclaimer, the term of this patent is extended or adjusted under 35 U.S.C. 154(b) by 0 days.

(21) Appl. No.: 11/282,149

(22) Filed: Nov. 18, 2005

Related U.S. Application Data

(63) Continuation-in-part of application No. 09/648,989, filed on Aug. 25, 2000, now abandoned.

(60) Provisional application No. 60/151,290, filed on Aug. 28, 1999.

(51) Int. Cl.
*G06F 17/50* (2006.01)

(52) U.S. Cl. ......................................................... 705/7

(58) Field of Classification Search ...................... 705/7
See application file for complete search history.

(56) References Cited

U.S. PATENT DOCUMENTS 5,355,317 A * 10/1994 Talbott et al. ................. 700/97
5,822,206 A * 10/1998 Sebastian et al. ............. 700/97
5,999,908 A * 12/1999 Abelow ......................... 705/1

OTHER PUBLICATIONS

Martensen, Anne; Dahlgaard, Jens J.; "Integrating Business Excellence and Innovation Management: Developing Vision, Blueprint and Strategy for Innovation in Creative and Learning Organizations", Total Quality Management, Jul. 1999.*

Dahlgaard, Jens J.; Dahlgaard, Su Mi Park; "Integrating Business Excellence and Innovation Management: Developing a Culture for Innovation, Creativity and Learning", Total Quality Management, Jul. 1999.*

Hoffman, Richard C.; "Organizational Innovation: Management Influence Across Cultures", Multinational Business Review, Spring 1999.*

Frappaolo, Carl; Capshaw, Stacie; "Knowledge Management Software: Capturing the Essence of Know-How and Innovation", Information Management Journal, Jul. 1999.*

* cited by examiner

*Primary Examiner*—Jeffrey A. Smith
*Assistant Examiner*—Kalyan Deshpande

(57) ABSTRACT

A method and system to manage, exchange, and apply innovation related IT data. The method includes receiving data inputs from several sources, qualifying data inputs, selecting one or more of the qualified data inputs, selecting at least one innovation technique, and applying the selected innovation technique to the selected data input. Potential innovation solutions would result from the successful innovation technique. A second test is applied to each one of the potential solutions, and at least one of potential solutions is selected. Each step in the process and the results thereof can be archived. A first embodiment of the invention is directed to a method of managing, exchanging, and applying innovation data. A second embodiment of the invention is directed to a system of managing, exchanging, and applying innovation data. A third embodiment of the invention is directed to a graphical user interface to manage, exchange, and apply innovation related data.

1 Claim, 15 Drawing Sheets

Meter as Input Device

622

Meter as Output Device

626

INNOVATION ENGINES

CROSS-REFERENCE TO RELATED APPLICATIONS

This application is a continuation-in-part application of a U.S. utility patent application Ser. No. 09/648,989, filed Aug. 25, 2000, now abandoned entitled "Innovation Engines," which is hereby incorporated by reference, and also claims priority from a U.S. provisional patent application Ser. No. 60/151,290, filed Aug. 28, 1999, entitled "Innovation Engines," which is also hereby incorporated by reference.

BACKGROUND OF THE INVENTION

1. Field of the Invention

This invention relates generally to a method and system for managing, unifying, and developing organizational innovation, and more specifically relates to linking diverse methods and systems, supported by data processing, to manage and organize innovation and processes directed toward facilitating innovation in any field or industry.

2. Description of the Prior Art

Innovation management is often confused with project management which is primarily devoted to operations and work-flow rather than the creation of new knowledge. Prior innovation art in the past before 1999 and to the present has consisted of a diverse and disconnected patchwork of theories and approaches regarding creativity and idea generation predominantly "the use of brainstorming" (an informal group idea method introduced around 1950).

The pursuit of innovation as a deliberate and attainable objective has grown more intense with time. No longer can a major corporation simply wait around for an inspirational moment or hope that new products, services and ideas will magically appear in a suggestion box. Competition has forced some successful companies to actively seek methods to search for new ideas for products and services. Several ad-hoc organizational approaches and styles of innovation development have emerged, but many still have not gone beyond initial brainstorming and idea management.

These efforts also include seeking innovation support from outside sources such as consultants, academia, acquisition, creativity courses, as well as contests and team driven programs. Some of these approaches have met with mixed success, depending on the quality of the providers, but these approaches have not established an exportable internal innovation competence.

Another approach to fostering innovation is where a company establishes a department of innovation, or an equivalent, to be the central point of innovation efforts. Well-intentioned managers in finance or technology are typically put in charge of such projects, but many of these managers have been totally without experience or training in using innovation methods, and some of these managers have been hostile to creativity.

While sometimes useful, these innovation approaches are inconsistent and still leave much to be desired, because many of these approaches require much trial and error, often leading to dead ends or aborted programs. Few of these approaches are codified or can be repeated or otherwise used by another department or organization.

While innovation development is acknowledged as an important technological and economic goal, innovation in a typical company at this time lacks established professional methods and systems, and has progressed far too slowly. Some published documents are listed below as examples.

It should be noted that most of the published documents below were filed long after the U.S. provisional application filing date for the present invention in August of 1999, and after the U.S. utility patent application filing in August of 2000. Furthermore, the documents below do not disclose comprehensive innovation development and management.

U.S. Utility Pat. No. 5,109,337, issued Apr. 28, 1992, to Ferriter, et al., entitled "Conceptual Design Tool," discloses a product design tool to flesh out a hardware design and manufacturing spec. Ferriter, et al. do not disclose a solution to general innovation problems, but disclose a methodology for iterating through a hardware design process and tracking important documentation and manufacturing information, using a computer-based project management system.

U.S. Utility Pat. No. 5,355,317, issued Oct. 11, 1994, to Talbott, et al., entitled "Method and Apparatus for System Design," discloses a software tool focused on product development and definition of the evolving product, with a database that ties together different types of documents for defining the product as its definition evolves. The disclosure concerns product definition and design using a document management or project management system that collects information, but is not driving innovation through access to problem solving techniques.

U.S. Provisional Appl. Ser. No. US2003/093478, published May 15, 2003, by Hughes, entitled "Collaboration and Innovation System," discloses a collaboration and idea management tool, which facilitates innovation efforts being done in response to stated problems and/or identified opportunities.

U.S. Provisional Appl. Ser. No. US2003/0187706, published Oct. 2, 2003, by Buchmiller, et al., entitled "Innovation Engine Portal Method and System," discloses a classic knowledge management system to create an idea management system, with connections to "resources" and access to internal corporate subject matter experts). However, it does not disclose as a resource innovation techniques performed by people.

U.S. Provisional Appl. Ser. No. US2004/0054567, published Mar. 18, 2004, by Bubner, entitled "Analysis of Business Innovation Potential," discloses employment of an innovation audit survey as a tool for making investments. It also discloses that innovation audits have been a standard tool for innovation practitioners since the 1980s. Bubner discloses that innovation management is in its infancy due to lack of theory and models. Bubner also discloses a model that is idea driven, rather than opportunity driven.

U.S. Provisional Appl. Ser. No. US2004/107131, published Jun. 3, 2004, by Wilkerson, et al., entitled "Value Innovation Management System and Method," discloses a system for evaluating customer/consumer data to select a direction for product development that will provide value to the customer. It does not disclose managing the creative aspects of problem solving, nor giving users guidance.

Canadian Pat. No. CA2490613, issued Jun. 29, 2005, to Mark Ortiz, et al., entitled "Graphical Representation, Storage and Dissemination of Display Thinking," discloses a technique for facilitated problem solving and collaboration. It discloses note cards and storyboarding as tools used in many other problem solving techniques. The ability to capture sessions for later reference or revision is disclosed, but this is not an innovation system.

U.S. Provisional Appl. Ser. No. US2004/044135, published Feb. 24, 2005, by Klausnitzer Norbert, entitled "Method for Managing and Providing an Idea Management System," discloses an idea management system that includes an aspect of CRM (Customer Relationship Management) if it is setup to accept ideas from customers. The disclosure does not address other sources for ideas, problem solving or organizational setup for innovation.

U.S. Provisional Appl. Ser. No. US2005/171910, published Aug. 4, 2005, by Wu Chuan-Yu, et al., entitled "Collaborative Operations in Product Lifecycle Management and System Thereof," discloses an information document management system (electronic document management system) for the product life cycle that can connect manufacturers with providers and customers. However, the disclosure does not address from where innovation may come.

U.S. Pat. No. 6,944,514, issued Sep. 13, 2005, to Matheson, entitled "Innovation Information Management Model," discloses an idea management system, not a complete innovation system. It defines innovation as product development, not as a generic ability to solve problems. It does not address where the ideas come from; it discloses a tool to document the design results. It also discloses linking disparate document types, but this is also done today by most document management systems. It does not disclose tools to move an innovation process, but instead discloses a tool to record and retrieve records of activities.

What is needed is a comprehensive method and system to assist an innovation process.

SUMMARY OF THE INVENTION

The present invention provides a method and system to organize and assist in all aspects of innovation. The invention can be implemented in numerous ways, such as by a method, a computer network, embedded applications, a program stored on computer-readable media, or in other ways. Three aspects of the invention are described below.

A first aspect of the invention is directed to a method to innovate using a data processing system. The method includes providing an innovation skills module to a user to select an appropriate Innovation skill within a plurality of innovation skills; providing a direction finding module to the user to select a direction to explore in innovation from a plurality of directions; providing a solution finding module to the user to determine a solution from a plurality of solutions; providing an intelligence and communication module to the user; providing a strategic development module to the user; and providing a test and evaluation module to the user.

A second aspect of the invention is directed to a method to innovate using a data processing system. The method includes receiving a group of data inputs from a group of sources; qualifying a qualified data input of the data inputs; selecting a qualified data input; selecting an innovation technique from a group of innovation techniques; and applying the innovation technique to the qualified data input to identify one or more potential solutions.

A third aspect of the invention is directed to a data processing system to accelerate innovation. The data processing system includes a central processing unit; a volatile memory module coupled to the central processing unit; a non-volatile memory module coupled to the central processing unit; a user interface and adapter module coupled to the central processing unit, wherein the user interface and adapter module assists a user in a plurality of innovation tasks; and a communications and network interface and adapter module coupled to the central processing unit.

These and other objects and advantages of the invention will become apparent to those skilled in the art from the following detailed description of the invention and the accompanying drawings.

DETAILED DESCRIPTION OF THE PREFERRED EMBODIMENT

Prior art innovation approaches were dependant on ad-hoc and intuitive approaches, fragmented and not cohesive. One embodiment of the I-E invention is formulated as an embedded innovation architecture. This means that it has identified and incorporated key and essential innovation elements in a landscape that was not previously recognized or apparent. For example, the elements of opportunity mapping, idea generation and selection, decision and measurement and innovation viability were not seen or connected as a single system. One embodiment of the invention has linked them together in a way made accessible to users, individual, companies, and groups.

One embodiment of the invention includes ideas for a unified or reductive innovation process, that applies to any situation that calls for an innovation outcome, not just products or technology; for example innovation can also benefit law, education, hospitals, medicine and fields outside of products. Essentially, while others see project management as an innovation process, this invention is broader, because it has identified all innovation features as a part of single landscape. The working principles of successful innovation application are identified, given access, and directed towards measurable implementation.

Figure 1:
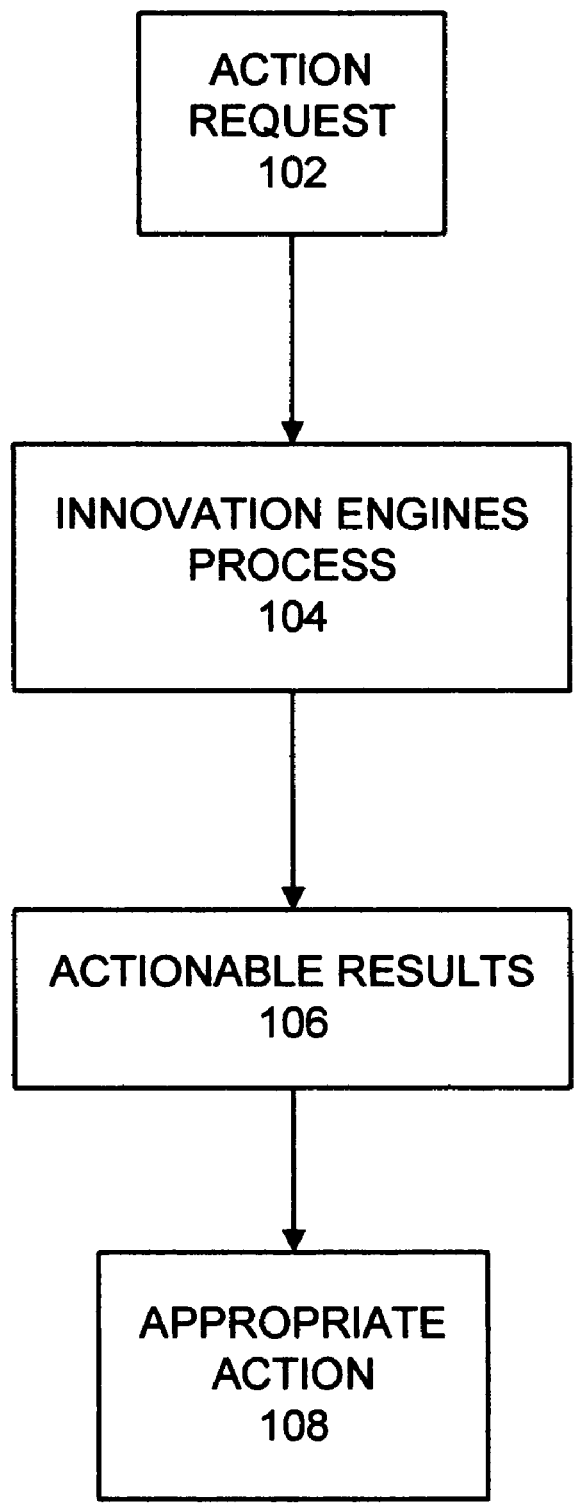
FIG. 1 illustrates an overview of one embodiment of the invention using a data processing system, in accordance with one embodiment of the invention.

FIG. 1 illustrates an overview of one embodiment of the invention using a data processing system, in accordance with one embodiment of the invention. This configuration contains multiple innovation components and methodologies (shown below in Tables 1A and 1B) linked together by a data processing system into an integrated innovation engine (I-E) architecture. This architecture gives innovation a more rational and consistent basis for development than what can be accomplished with simple brainstorming. This embodiment can then be applied to the broadest range of innovation needs in a system that was not previously available as a single and dedicated organizational system. Applications for innovation are wired into a carefully organized bank of proven processes, and can encompass such diverse innovation needs as product development, cost reduction, production, next generation, and radical innovation, as well as mission critical management issues and other types of problems which require innovation solution.

The engine is engaged by starting with action request inputs block 102 as the entry point of Action Requests. These are received as data types and can be any media data file. The database forms collect data and log file attachments; this can be done electronically through an input form (shown in FIG. 4). In alternative embodiment, other media forms, such as audio, verbal, or written requests may be entered by a coordinator. Requests are monitored and can be sorted and priority rated by one or more accountable coordinators (e.g., Innovation Coordinators, or equivalents) who expedite the system and its uses, and who have the competence and authority to oversee, direct, and authorize action.

In order to encourage, widen, and continue the flow of innovation worthy candidate ideas and proposals, an input template within action request inputs block 102 for receiving Action Requests is provided. Inputs originate from both internal and external input sources can be banked in cache. The disposition of such inputs may also be interpreted or initiated by a coordinator.

Figure 13:
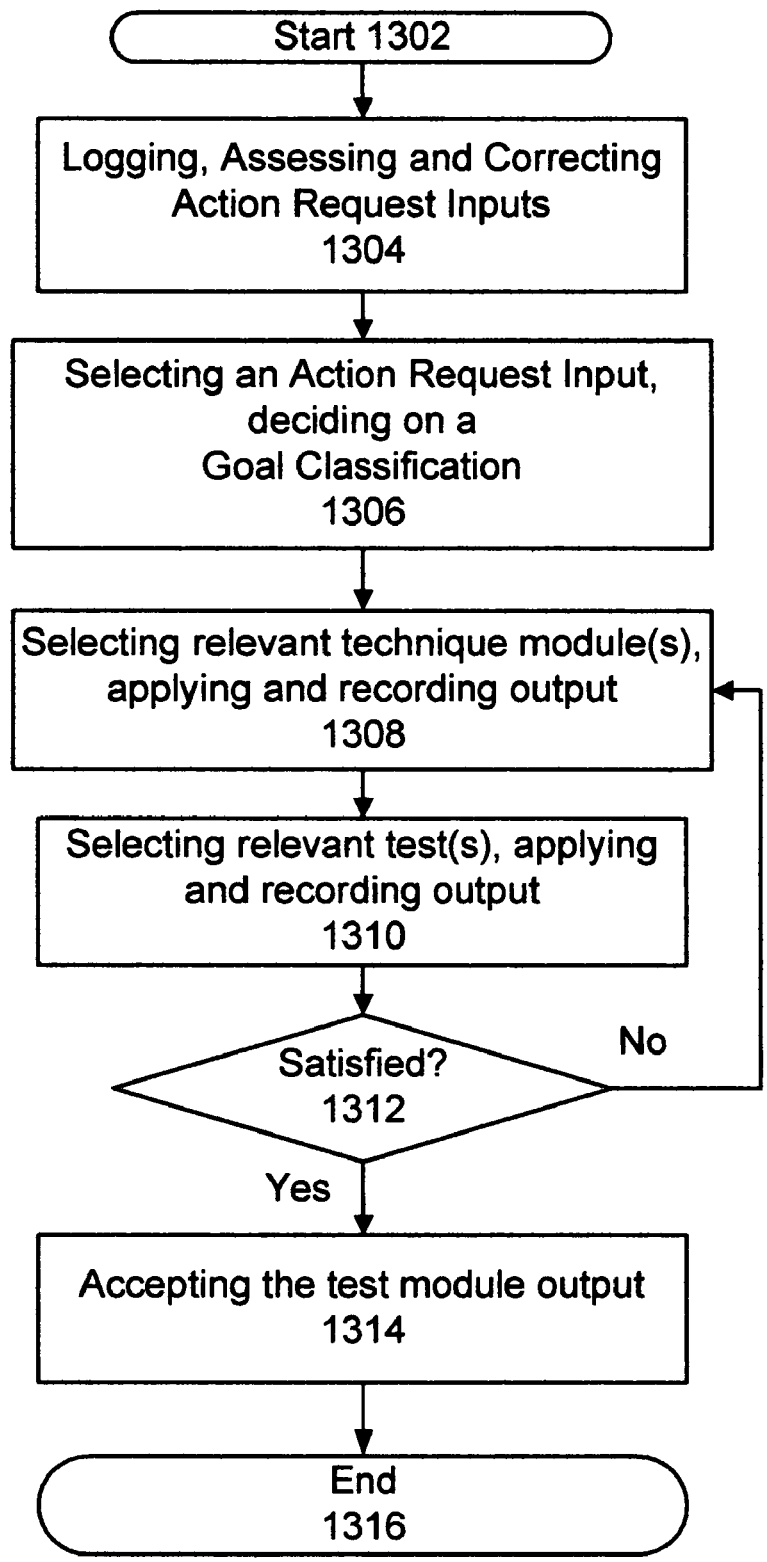
FIG. 13 represents a flowchart to innovate using a data processing system, in accordance with another embodiment of the invention.

Innovation Engine Process Workflow Block 104 (the operations are shown in FIG. 13) can be accessed for innovation search and solution finding once inputs from varied sources are received, defined and authorized. The invention then provides a structured data system of linked innovation components (i.e., domains) that offer multiple paths, methods, sequences to address such applications and goals noted below. This is based on using more concise innovation structure, rather than dependence upon limited and narrow ad-hoc and intuitive approaches. While creativity talent is always encouraged and introduced, I-E reinforces such talents with consistent and more powerful tools to organize, manage, simplify, and leverage an organization's latent total innovation potential, such as its human capital and other resources and operations.

If managed by the coordinator all requests may be preliminarily tested for business sanction, budget, time or other aspects of implementation viability. They may then be moved either to status of review, hold, authorization, or assignment. Project leaders or other independent users such as designers, inventors, or engineers may apply any or all of the I-E resources elements and incorporated tools. All others, including untrained or inexperienced users, are advised to follow the I-E process workflow (shown in FIG. 13). When solutions are generated, some primary result examples can be new products or services, new opportunities, new business plans, or such results as defined above in innovation engines process block 104. Some secondary results examples can be trained Innovation Masters® and facilitators, identification of technical expertise, input to employee reviews, new team models (dyads, triads & cross functional members). Self training can occur with increased system use and familiarity but will also be supported by down load tutorials, desktop tech help, and a self training program called Innovation Masters® included in innovation skills block 202.

Innovation outputs of the system may be designated as actionable results from which appropriate action may be taken. Such action may be determined by further testing using the A-WIN module as supported in domain 212 in order to produce more measurable and quantifiable indicators of both project value and worthiness as well as risks revealed by the application of the "fatal flaws and hazards check" risk sequence in the A-WIN GUI.

Figure 2:
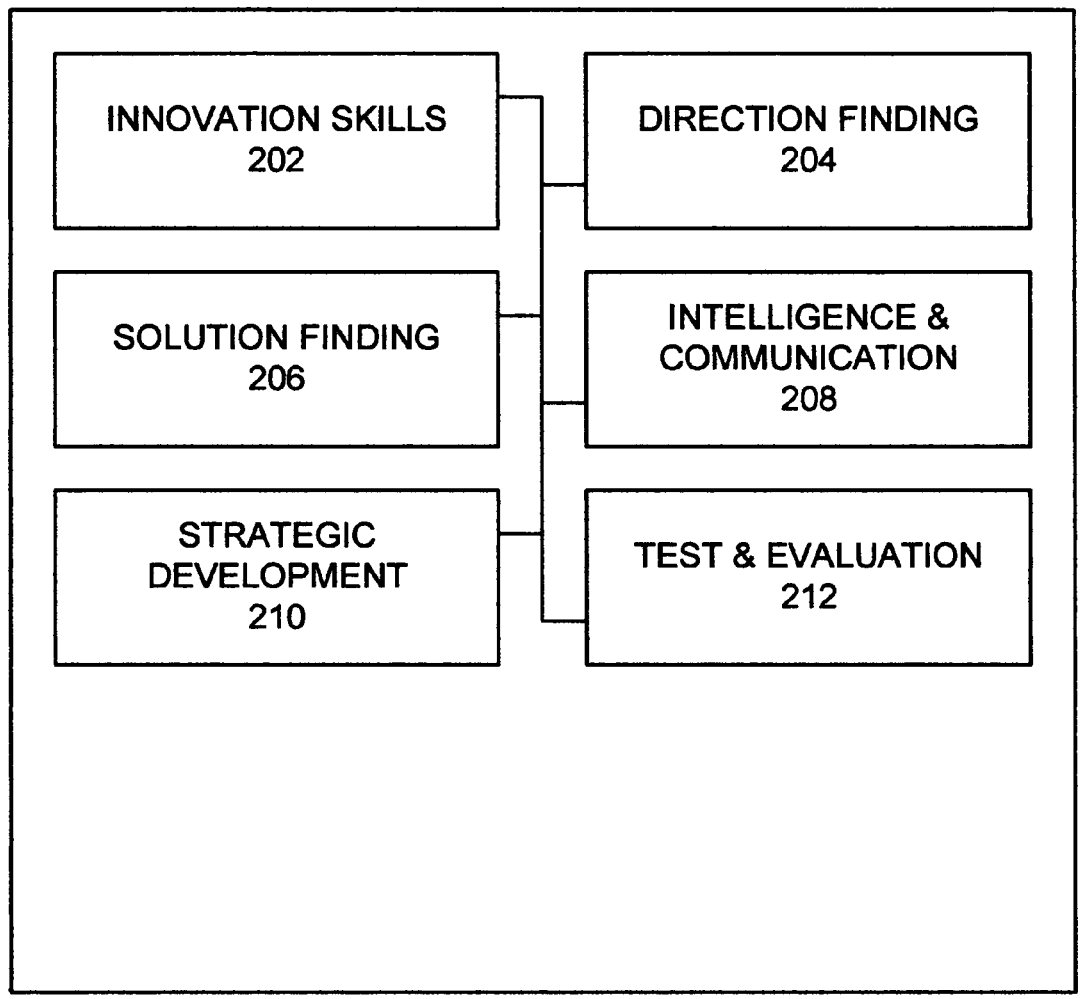
FIG. 2 illustrates a major innovation engine (I-E) organizational block diagram, according to one embodiment of the invention.

FIG. 2 illustrates a major I-E organizational block diagram, according to one embodiment of the invention. FIG. 2 illustrates data elements referred to as innovation "Domains" of which the prime six working groups are shown in blocks 202, 204, 206, 208, 210, and 212. Each component is a focused category or domain, that contains multiple, relevant practices and techniques defined by that category and shown in Tables 1A, 1B, and 3.

These major components are described as Innovation Skills 202, Direction Finding 204, Solution Finding 206, Intelligence and Communication 208, Strategic Development 210, and Test and Evaluation 212. The components for Test and Evaluation 212 are further described below.

Innovation Skills 202 is a domain category contains methods and processes for innovation training and evaluating innovation competence and skills such as facilitation, building creative teams and measuring performance, tutorials, facilitation, team formation, case histories of successful innovations and innovation leaders, understanding serial innovation principles and innovation models as well as other related aspects.

Direction Finding 204 is a domain is used to locate or discover new opportunities and to help creatively answer traditional questions such as, "What is our true mission or goal? What innovative directions can a project or program take? What are the most viable areas for exploration or research?" The answer to these questions will determine the parsing of major resources and which project directions to pursue. Direction finding includes techniques that relate to finding new directions such as use of "Futures Wheel" or as can be navigated by use of the "Opportunity Finding" module.

Solution Finding 206 is a domain category that includes the provision of a resource of techniques used for idea generation, new concepts, and brainstorming. Solution finding utilizing diverse methods such as morphological mining, constructive discontent is intended to produce a range of alternatives and options from which the most preferable candidates can be selected. Solution finding includes innovation techniques relating to the development of new ideas and concepts and the modules are accessed in this domain.

Intelligence and Communication 208 is a domain that includes methods and processes for gathering existing knowledge and information relative to an innovation program or goal. The existing and fresh data, new information, and research is essential to innovation and can provide documentation, legitimacy and facts to assist the user in being on the right track and justifying a specific program at the earliest stage.

Strategic Development 210 is a domain category that includes a range of innovation techniques for helping to direct the user organization to employ the I-E to focus on project impacts, consequences, and options. Examples include joint ventures, partnerships, the acquisition of a technology, or merger with another organization, or distribution and such issues as relocation, downsizing and outsourcing.

Test and Evaluation 212 is a domain that provides templates for various levels of performance and proposal evaluations and rating.

Figure 3:
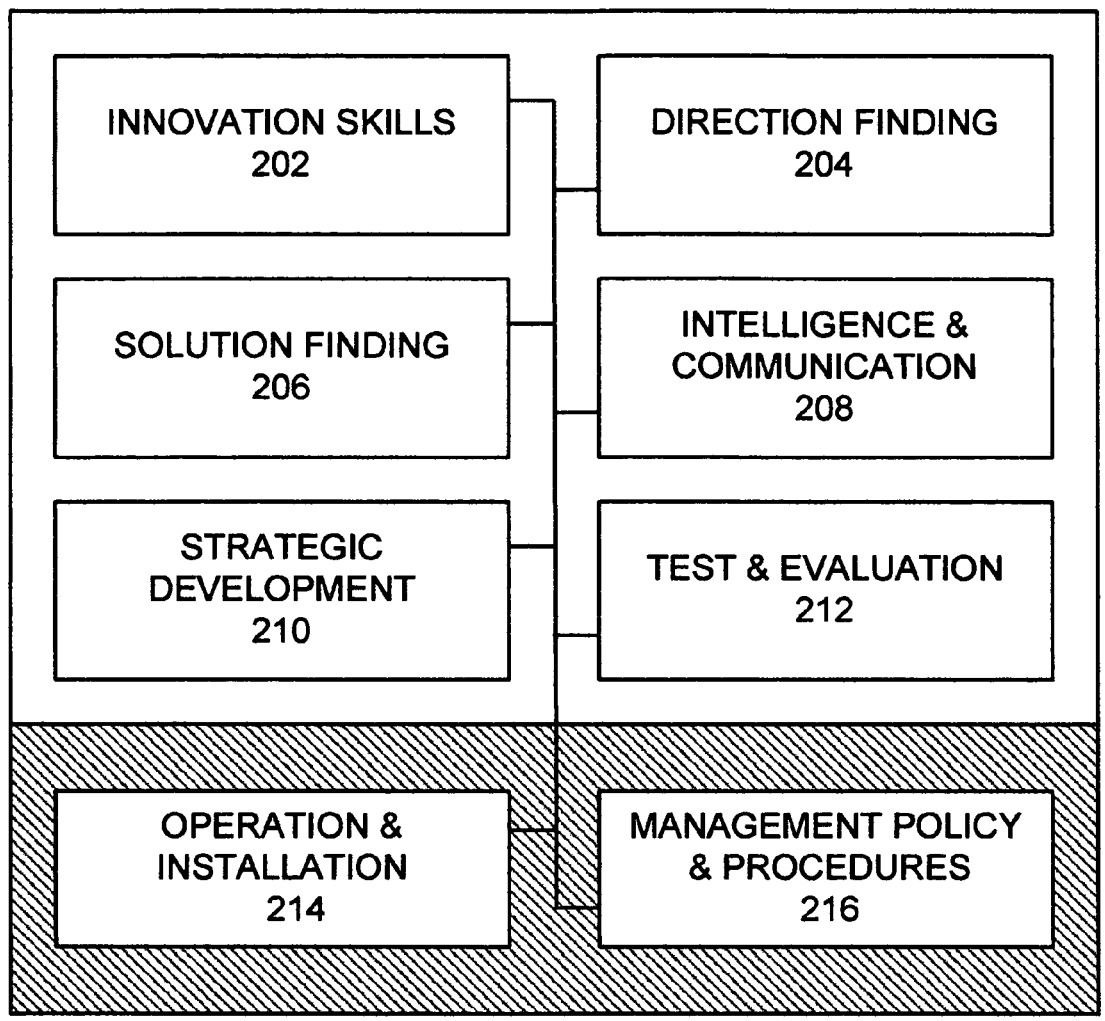
FIG. 3 illustrates a major I-E organizational block diagram, according to another embodiment of the invention.

FIG. 3 illustrates a major I-E organizational block diagram, according to another embodiment of the invention. FIG. 3 again illustrates data elements referred to as innovation "Domains" of which the prime six working groups are shown in blocks 202, 204, 206, 208, 210, and 212. Each component is a focused category or domain, that contains multiple, relevant practices and techniques defined by that category and shown in Tables 1A, 1B, and 3. In addition, two more domains 214 and 216 are included.

Domains 214 and 216 are Operational and Governance domains respectively, in one embodiment of the invention. Operational Domain 214 services all operations such as the enterprise installation of I-E and compatibility with other IT and data processing systems. It also runs data distribution, coordinator's command and control station, logging and templates updates, archival and legacy storage and other data update functions.

Governance Domain 216 maintains essential management policies, protocols and innovation procedures to reinforce commitment and insure that climate, incentives and environment are consistent and aligned with best practices and management goals.

TABLE 1A

Innovation Technique Modules by Domain

| INNOVATION SKILLS | SOLUTION FINDING | DIRECTION FINDING |
|---|---|---|
| Acceptance finding | 1000 plots | 5 step process |
| Best Practice PDMA | 5 step process | Allegory and murals |
| Cache and I-E database | Analogies and metaphors | Brain writing |
| Case histories | Associations | Brainstorming |
| Consensus building | Attribute listing | Crawford slip method |
| Creative problem solving(CPS) | Brainstorming | Customer as designer |
| Environment rose room | Conscious dreaming and incubation methods | Delphi |
| Facilitator skills | Constructive discontent | Excursions |
| | Different planet | Focus group |
| | | Futures |
| | | Image force fit |

TABLE 1A-continued

Innovation Technique Modules by Domain

| INNOVATION SKILLS | SOLUTION FINDING | DIRECTION FINDING |
|---|---|---|
| IM Recruit skills | Excursions | excursions |
| Innovation Masters | Extensions | Inventors |
| IWWMW | Force fit | Kipling's 5 men |
| Mind mapping | Guided imagery | Knowledge management |
| Role play | Image force fit excursions | Market research |
| Visionizing | Mapbilden | Monitoring |
| | Morphological listing | My day in the future |
| | New product development | My job in the future |
| | Patent investigations, e.g. TRIZ | Opportunity mapping |
| | Relaxation techniques | Partners |
| | Ridiculous humor | Suppliers |
| | Technology substitution | Why |
| | Value analysis | |
| | What if | |
| | Who, What, When, Where checklists | |
| | Wish Fulfillment | |

TABLE 1B

Innovation Technique Modules by Domain

| STRATEGIC DEVELOPMENT | INTELLIGENCE & COMMUNICATION | TEST & EVALUATION |
|---|---|---|
| Acquisition (of company or technology) | Academia | Acceptance Check screen |
| Cooperative & Joint partner | Chat Room | Advantage-Disadvantage |
| Entrepreneurial | Competitive intelligence | Analytical Hierarchical Processing |
| Forecasting | External sources | A-WIN |
| Futures wheel | Government research sources and laboratories | A-WIN light |
| HES Scenario | Groupware | Battelle Method |
| Project Team | Industry Trends | Benchmarks |
| Skunk Lab | Intellectual property search | Castle Technique |
| Soloist | Internal outreach network | Competitive Advantage |
| Spin off | NERAC and other commercial search services | Creative Evaluation |
| SWAT Team | Newsletters | Decision Balance Sheet |
| Technology transfer | Paradigm shift | Goalstorming |
| University/academia | Trend forecasting | Idea Advocate |
| | Web (Internet) | Pre-test |
| | | Pugh Concept Selection Matrix |
| | | SPAN Voting |
| | | Sticking Dots |
| | | Weighted systems |

TABLE 2

Innovation Classifications and Techniques

| GOAL CLASSIFICATION | DEFINITION | EXAMPLES | MOST EFFECTIVE PROBLEM SOLVING TECHNIQUE(S) |
|---|---|---|---|
| Competitive advantage | Seek product superiority | Disposable contact lens eliminates cleaning vs. long wear lens | Analogies & Metaphors Wish fulfillment |
| Competitive response | Match or exceed a competitor's | Bookstores add websites sales to | Analogies & Metaphors |

TABLE 2-continued

Innovation Classifications and Techniques

| GOAL CLASSIFICATION | DEFINITION | EXAMPLES | MOST EFFECTIVE PROBLEM SOLVING TECHNIQUE(S) |
|---|---|---|---|
| | function, services or convenience. | compete with Amazon | Attribute listing Morphological listing Ridiculous humor |
| Management goals | Define, quantify, new objectives. | Dominate internet book sales | Brain writing Allegory 5 step process Crawford Slip Writing |
| Organizational mission | Measurable new outcomes. | Become the leader in voice recognition technology. | Allegory Opportunity mapping HES Scenario |
| Sales &marketing needs | Find new user attractions | New cell phone features for young adult market segment | Focus groups Wish fulfillment Trend forecasting Paradigm shifts |
| New product development in general | Establish superior new product specifications | Wood to fiberglass material substitution in boat building | Technology substitution Wish fulfillment Morphological Mining |
| Product life cycle extension | Enhance existing attributes | Use cartridge ribbons in typewriters to compete against word processors | Value Analysis Constructive Discontent Morphological Mining What If? |
| Next generation | Solve same problem with superior technology or performance | Technology leap. Re: tape cassettes to CDs to MP3s | Technology Substitution Guided imagery TRIZ |
| Product correction | Determine problem, error, or continued area of deficiency. | E.g. tires: new ways to prevent blow-outs | Failure Analysis Kipling's 5 Men |
| Business diversification | Discover viable, related areas for products & services. | Military ball bearing manufacturer enters sports equipment field. | Opportunity Mapping Excursions IWWMW |
| Opportunity search | Create or find new or emerging areas of opportunity. | Anticipate teenagers' use of text messaging via anthropological research | Opportunity Mapping My day in the future Future Wheels |
| Systems and process problem | Improve, correct, or redesign existing process. | Mfr of automobiles seeks to reduce line changeover time. | Attribute listing Kipling's 5 Men TRIZ |
| Cost reduction | Find and direct new ways to eliminate cost or expense. | Design for manufacturability so robots can perform simple assembly tasks. | Value analysis' 5 step process IWWMW |
| Organizational performance | Improve specific skills and achievement. | Improve customer satisfaction via lower level accountability | Allegory and murals HES Scenario Role play |
| Futures A | Provocative or breakthrough idea | Sport shoe company imbeds wheels in shoes for roller-blading | What if? Wish fulfillment |

TABLE 3

Management and Innovation System Procedures

| MANAGEMENT POLICIES & PROTOCOLS | INNOVATION SYSTEM PROCEDURES |
|---|---|
| Innovation Mission Policy | Submission &confirmations |
| I-E applications to management issues and mission critical problems | Monitoring templates Cross Fertilization &diversity Innovation SKUNKLAB Teams |
| Establish role for executive-innovation coordinator | A-WIN Rating rules &application Project test &Quantifications |
| Equity models | Contribution Credits-Record |
| Implementation requirements | Priorities &Official Assignment |

TABLE 3-continued

Management and Innovation System Procedures

| MANAGEMENT POLICIES & PROTOCOLS | INNOVATION SYSTEM PROCEDURES |
|---|---|
| Proposal to Approval steps | Documentation |
| Evaluations &testing | Project Starts |
| Budgeting requirements | Pre-work Dialogs |
| Entrepreneurship | Team Formation |
| Merit Review + creative inputs | New CPS methods trials |
| Recognitions | Orientation of new hires |
| Incentives &rewards | Facilitators' best practice |
| Innovation training &manual | |

Figure 4:
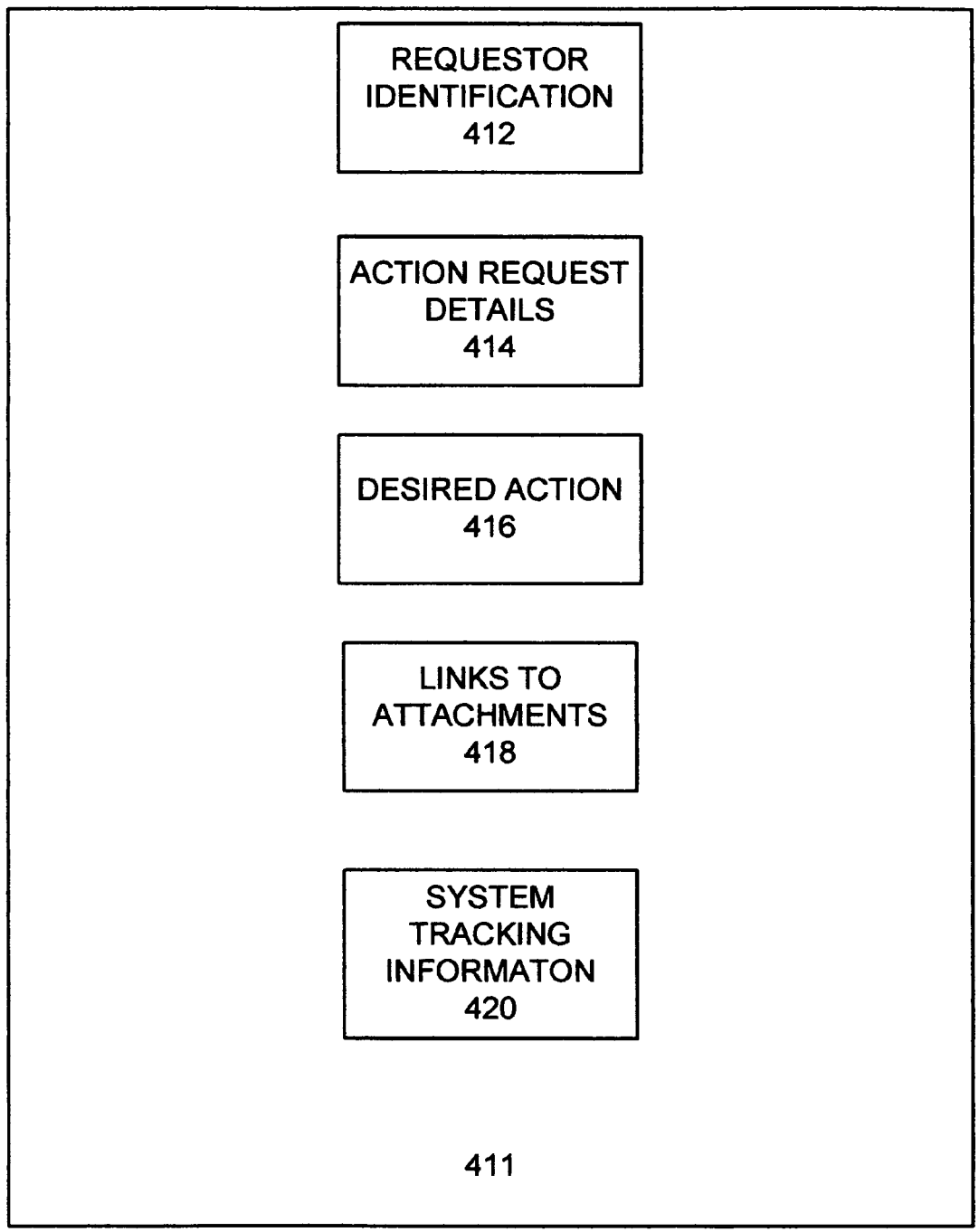
FIG. 4 is a block diagram of major components of an Action Request form GUI, in accordance with one embodiment of the invention.

FIG. 4 is a block diagram of major components of an Action Request form GUI, in accordance with one embodiment of the invention, as a computer based document form that begins the workflow with action request inputs block 102 (shown in FIG. 1). Section 412 collects identification of the requestor such as name, company and department as well as contact information such as phone numbers and email address. Section 414 collects information about the request itself such as a summary title and a detailed description of the request. Section 416 provides a list of options that the requestor may request for eventual action such as implement, request for assistance, assess opportunity, assess threat, or log completed accomplishment. Section 418 collects links to other files and information sources that may be needed to complete or support the request description such as problem logs, reports, drawings, pictures, text files or sound files. Section 420 provides system tracking and processing information as determined by corporate needs such as a request unique identifier, stages of review and disposition, assignments to personnel, approvals and dates of activities.

Figure 5:
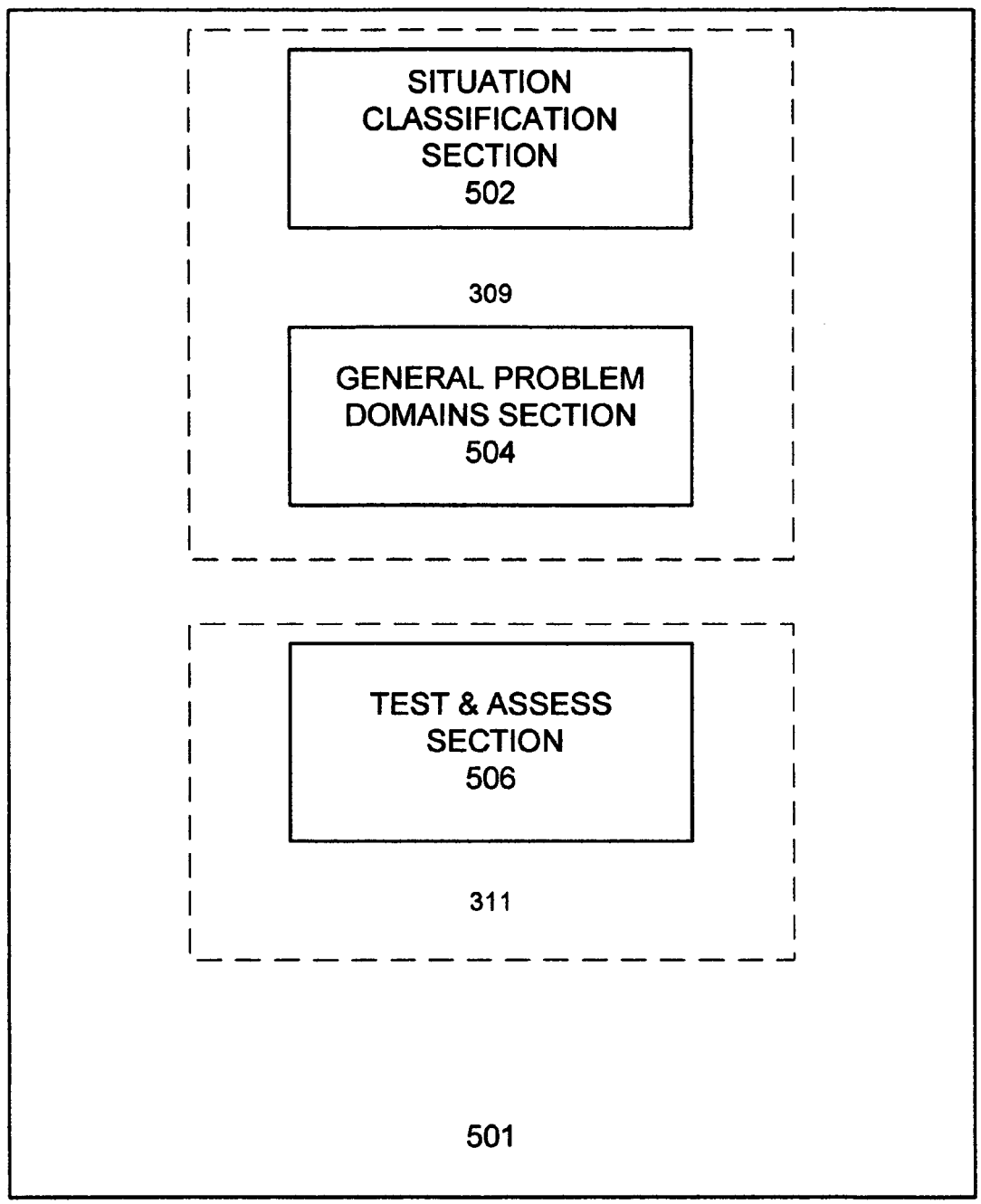
FIG. 5 illustrates a block diagram of a control GUI embodiment that can be used to provide access to guidance in Tables 2 and 3, in accordance with one embodiment of the invention.

FIG. 5 illustrates a block diagram of a control GUI embodiment that can be used to provide access to guidance in Tables 2 and 3, in accordance with one embodiment of the invention. Situation Goal Classification Section 502 and General Problem Domains Section 504 support the activities of the I-E process workflow block 1308 shown in FIG. 13. Test and Assess Section 506 supports the activities of the I-E process workflow block 1310 shown in FIG. 13. Situation Goal Classification Section 502 provides access to the classifications of Table 2. One embodiment uses a drop-down selector to provide a list of classifications for the user to choose from. The resultant list of problem solving modules for that classification is displayed, along with relevant support links for such items as templates, best usage descriptions, flowcharts, training and examples. If the user does not find a matching classification, then General Problem Domains Section 504 provides access to Table 3 for broader classifications of the domains. Additional selection criteria can be provided in drop-down lists such as time available, number of people involved (single, small number, larger groups), leadership requirements of the technique or the scope of the technique. The problem solving modules are displayed in a manner similar to Situation Goal Classification Section 502, allowing the user to browse the best usage guidance to find the most relevant problem solving modules.

Figure 6A:
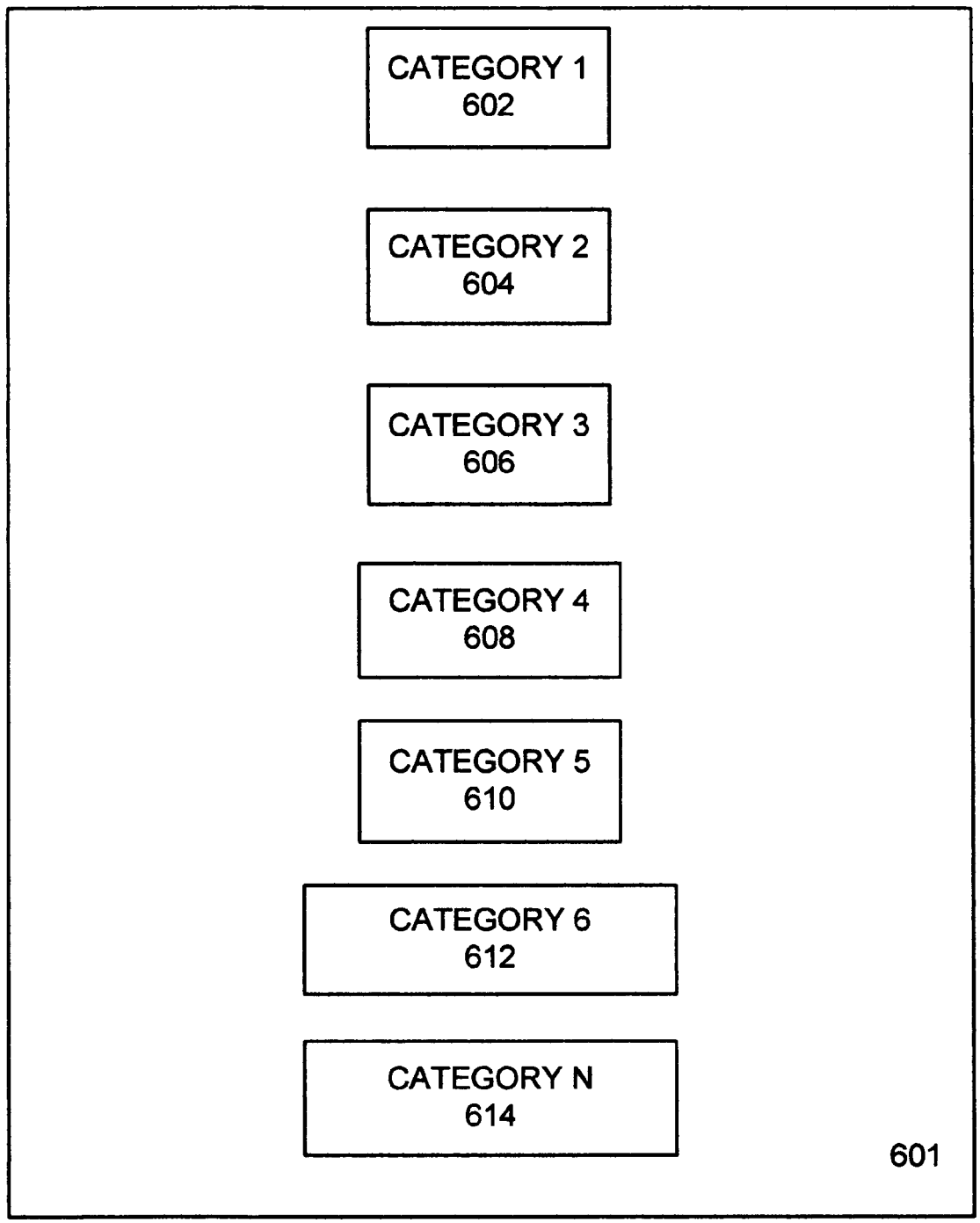
FIG. 6A illustrates an "A-WIN" graphical user interface, in accordance with one embodiment of the invention.

FIG. 6A illustrates an A-WIN graphical user interface, in accordance with one embodiment of the invention. The experienced view or opinion of key decision makers is entered and recorded for each value attribute shown in that indicator category. In one embodiment, there are as many as 38 universal input/output indicators that can be customized to suit particular organizational needs and values. Each indicator question is explained and governed by drop-down guidelines that inform the user about the specific parameters and guidelines for response. Indicators may be grouped into categories such that the most critical items are near the top of the form. Business rules can be established for indicator usage, e.g. requiring a usage sequence, requiring a minimum number of indicators to be input before submitting the form or abstaining from inputs outside one's area of expertise. This input process may be done in a group or single participant setting or as individual inputs by laptop or other electronic device submission. The benefit of both individual and group responses is that the entire assessment overview can be seen immediately as one field and without assembling all participants in a single location. Aggregate group response for each indicator may be displayed in the indicator's output role as an average distribution, a standard deviation or other meaningful statistical summary.

The rating for each value attribute made by each participant (i.e. a decision maker) is indicated by the indicator position he/she elects to input by moving the indicator arrow or other icon. For example, in one embodiment, grabbing a pointer, arrow, or another equivalent graphic element can be done by using a keyboard or mouse device that permits moving the indicator arrow to the preferred position and may be shifted to the left (negative and in red hue), center (yellow hue), or right (positive in green hue). Faster evaluation is made possible by using color coding of the indicator background. For example, a total field of green indicators, with all directions (such as needles or arrows) pointing to the right would indicate the potential for an exceptionally positive and successful program. In one embodiment, a field of red would denote problems and a mixed field of predominantly yellow and red would suggest great uncertainty, caution, and divided opinion as to values. Weighted summaries of multiple indicators can also be calculated and displayed if desired.

The significant benefit brought here is the ability for organizations to rapidly (hours rather than days or weeks) sort through a continuous and large number of proposals and actionable possibilities while they are still in an embryonic stage thus saving considerable time, research and additional feasibility and prototype expense. Decision to abandon or eliminate in such cases can be done without misgiving or second-guessing because it represents the merged collective wisdom of key decision makers.

When all entries are completed the entire field can be a ganged array of total response inputs similar to a power station monitor control panel. These inputs can be seen and taken in at once as an overall mosaic of the quality and value of the proposal or idea. The benefit of this display is that deviant positions (such as for negative positions) can be immediately detected showing either consensus or polarity of opinions. Additionally indicators act as both input and out put devices; moreover this module also serves as a go-no go template for proposing teams or users to test out their ideas prior to submission to executive decision. Using the A-WIN GUI, if the user cannot bring the idea or proposal into the green zone in the first series of criteria questions, this would indicate that continuation would be a waste of executive time. One embodiment uses the following criteria in Table 4 for evaluating proposals.

TABLE 4

Sample Categories for A-WIN Measures

| CATEGORY | CRITERIA TEST | EXAMPLES |
|---|---|---|
| 602 | QUALITY OF INNOVATION | Marketing advantage Technical advantage |
| 604 | VALUE OF IDEA | Economics, Financial payback Size of investment required |
| 606 | SUCCESS CRITERIA | Criteria level as established by field or industry |
| 608 | COMMITMENT & INTEREST | Worth doing? Can we do it? Does anyone want to do it? Do we need to do it? Will it get done? |
| 610 | STRATEGIC POSITION | In the path of future growth? Portfolio Match Company fit? Market familiarity Technological familiarity Distribution & sales familiarity Time to market? |
| 612 | COMMERCIALIZATION POTENTIAL | R&D strength? Resources capability? Market size? Is market ready? Will it perform as expected? Satisfy a current or unfilled market need Superior to competitor? |
| 614 | FATAL FLAW & HAZARD CHECK (multiple inputs under each example item) | Wrong assumptions and errors Risk levels Implementation outlooks |

Figure 6B:
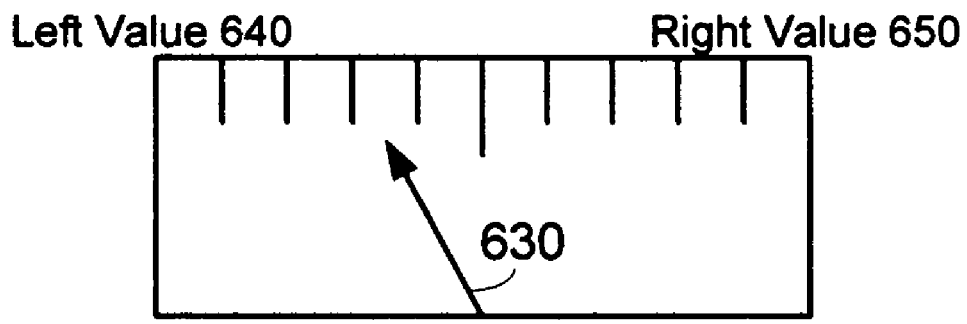
FIG. 6B is an embodiment of an indicator GUI that can be used in the A-WIN tool of FIG. 6A to collect user opinions and to display summary results from multiple users, in accordance with one embodiment of the invention.
Figure 6B:
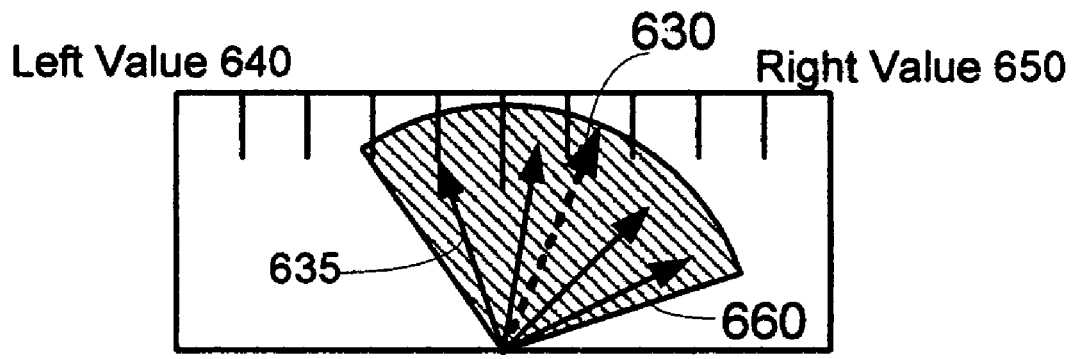

FIG. 6B is an embodiment of an indicator GUI that can be used in the A-WIN tool of FIG. 6A to collect user opinions and to display summary results from multiple users, in accordance with one embodiment of the invention. The indicator's purpose is to relieve the user of the distraction of converting an opinion into numeric scale by allowing the user to move an indicator that reflects his or her opinion. This time saving element maintains the user's focus on cognitive opinion so that a number of aspects can be processed quickly.

Indicator 622 is an input device in which the user moves a needle indicator 630 radially about an anchor point. The Left Value 640 and Right Value 650 represent extreme values of the aspect under consideration such as Bad/Good, Disagree/Agree or Minus/Plus. Labels for values between the Left Value 640 and Right Value 650 can also be shown if needed. The inputs are converted to numbers without user knowledge, scaled appropriately for calculations and stored in the workflow database 703 (shown in FIG. 7). In addition to movement, a background color change can also be used to add visual identification of the opinion. Additional functionality can be added via pop-up menus for such uses as interpreting the meaning of the input range or allowing entry of text to clarify important facts about the user's opinion.

Indicator 626 provides an output indicator with a strong resemblance to input indicator 622. The output indicator can be used to display a summary of opinions from multiple users. As before, Left Value 640 and Right Value 650 represent extreme values of the aspect under consideration such as Bad/Good, Discourage/Encourage, Disagree/Agree or Minus/Plus. As before, labels for values between the Left Value 640 and Right Value 650 can also be shown if needed. One method is to use a needle indicator 630 to represent a mean or median calculation from the stored scaled data. In addition, information about the dispersion of the data inputs can be displayed using smaller needles 635 of individual opinions, or by a shaded sector 660 representing a dispersion measure, such as standard deviation. The dispersion data is used to focus decision processes on areas of strongly differing opinions. In one embodiment, color can be used, such as in indicator 622 to add additional visual identification of a parameter, such as the mean.

Figure 7:
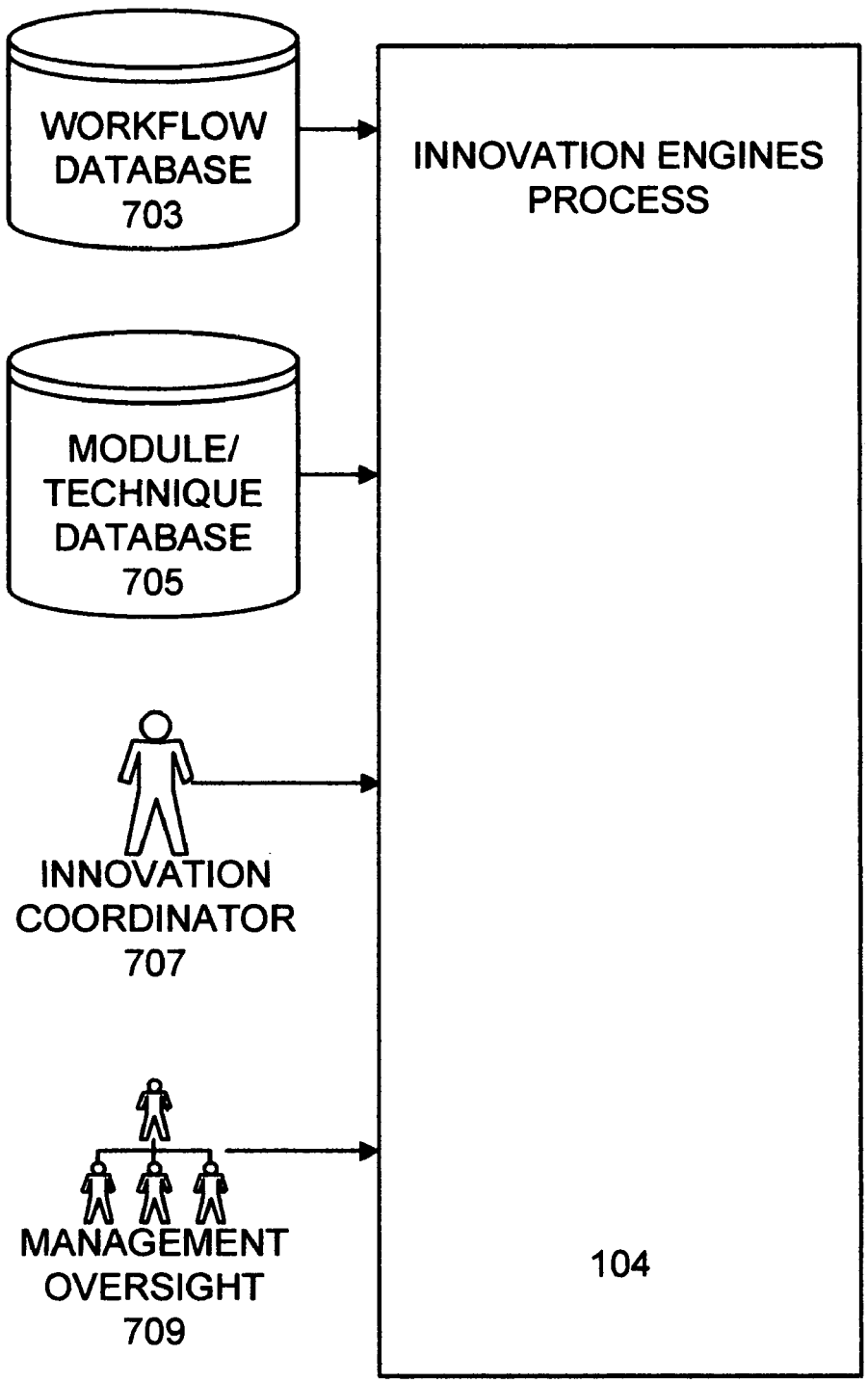
FIG. 7 is a block diagram of support components for the Innovation Engines process, in accordance with one embodiment of the invention.

FIG. 7 is a block diagram of support components for the Innovation Engines process 104, in accordance with one embodiment of the invention. The Workflow Database 703 is used to track information for Action Requests that are processed through the workflow process. Items such as the information on Action Request forms and potential actionable results are stored here. The Module/Technique Database 705 contains the relatively fixed data, such as shown in Tables 2 and 3 and as used in a control GUI embodiment (shown in FIG. 5). It also contains the data supplied for training tutorials and templates that guide usage of the modules. The Innovation Coordinator 707 represents the administrator of the workflow process, a normal position in any business workflow system. Management Oversight 709 represents the typical corporate management input in key decisions. For example, the selection of an actionable result for implementation may require management input concerning budgets, mission, goals and direction in order to choose the result for action that is best aligned with corporate priorities.

Figure 8:
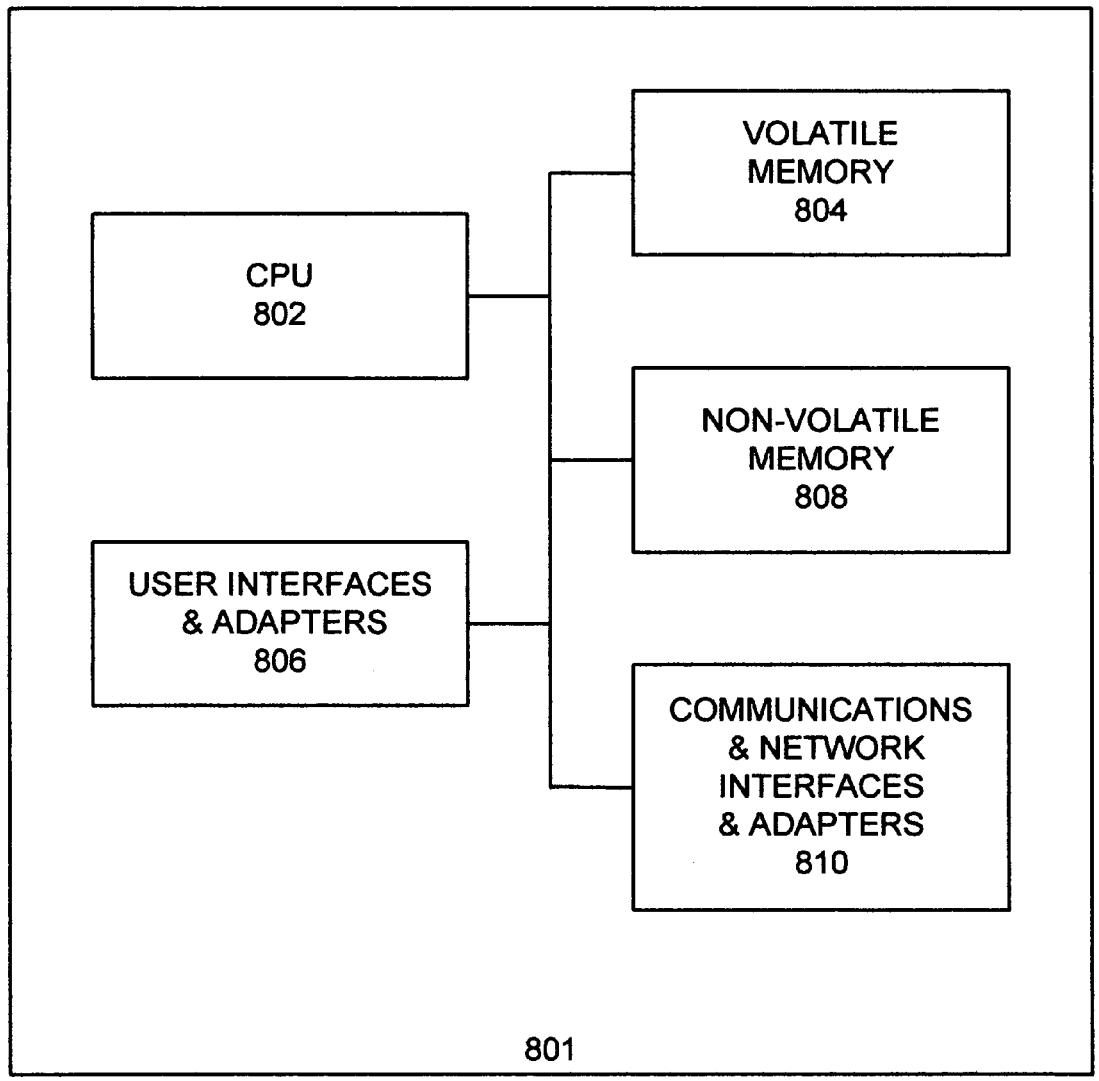
FIG. 8 is a block diagram of a representative data processing system to support computer aided I-E processing, in accordance with one embodiment of the invention.

FIG. 8 is a block diagram of a representative data processing system 801 to support computer-aided I-E processing, in accordance with one embodiment of the invention. This embodiment includes a CPU 802, volatile memory 804, non-volatile memory 806, user interfaces and adapters 808 and communications network interface and adapters 810. Non-volatile memory 806 can include both fixed and removable devices for entering and storing programs and data. Databases 703 and 705 are stored on nonvolatile memory 806. Network interface 810 provides linkage to additional resources such as a network, which can be any kind of local or wide area network, with other networked resources attached.

Figure 9:
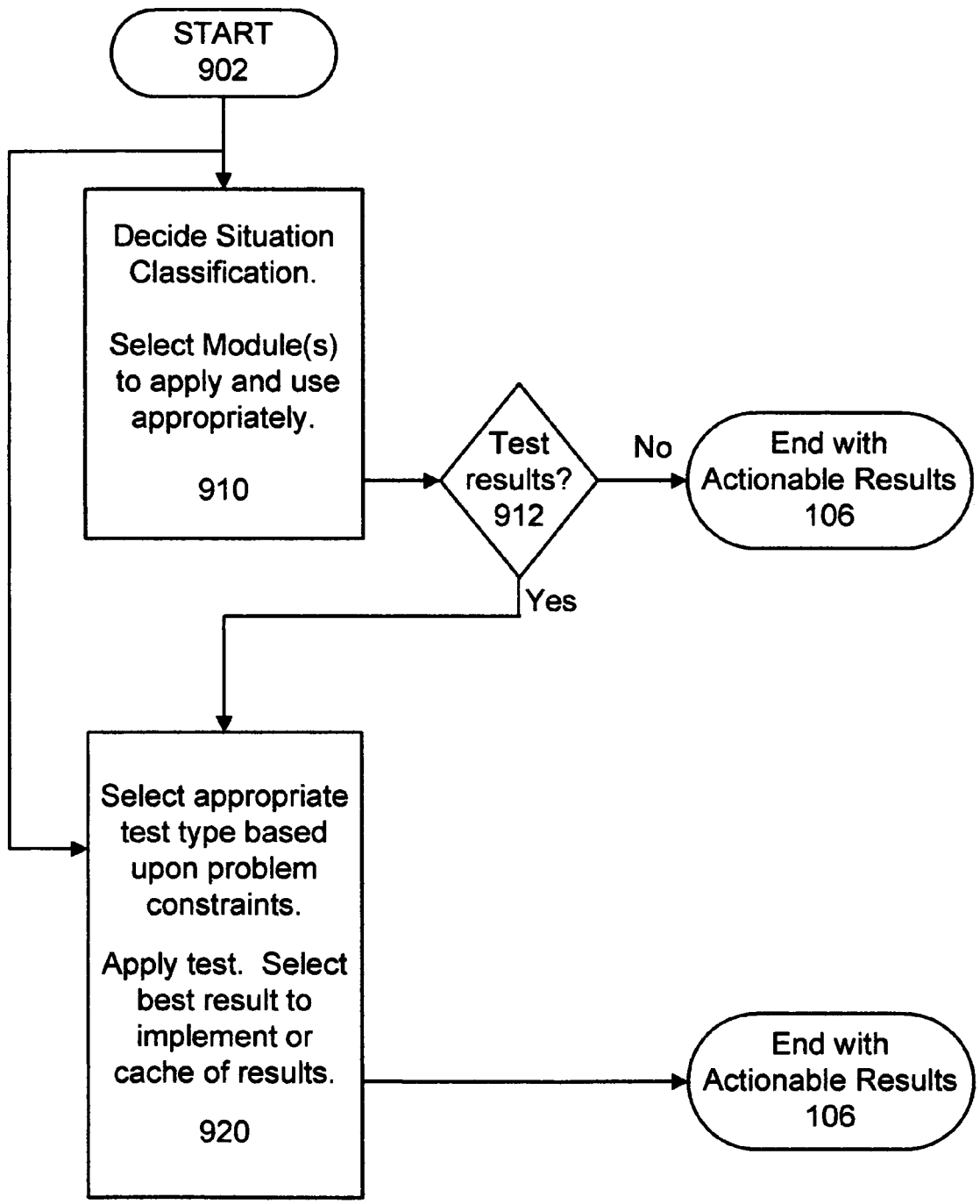
FIG. 9 represents a flowchart for independent users who are not required to follow a fixed workflow if all they wish to do is explore I-E or access individual technique modules, in accordance with one embodiment of the invention.

FIG. 9 represents a flowchart for independent users who are not required to follow a fixed workflow if all they wish to do is explore I-E or access individual technique modules, in accordance with one embodiment of the invention. Thus no interaction with workflow database is required or needed. The higher likelihood is that independent users will with time become more experienced and trained users such as the designated innovation coordinator, program managers, engineers, designers, inventors and other mind workers.

The method starts in operation 902. The next operation is 910, which includes deciding the situation goal classification, and selecting module(s) to apply. In operation 910 a user can, if they wish, determine their own situation goal classification and can refer to Table 2 and Table 3. The next operation is 912 and includes a test using the innovation engines process. If the results are satisfactory, then operation 920 is next, which includes selecting an appropriate test type based upon problem constraints, and applying a test to select the best result to implement or to store in a cache memory.

Figure 10:
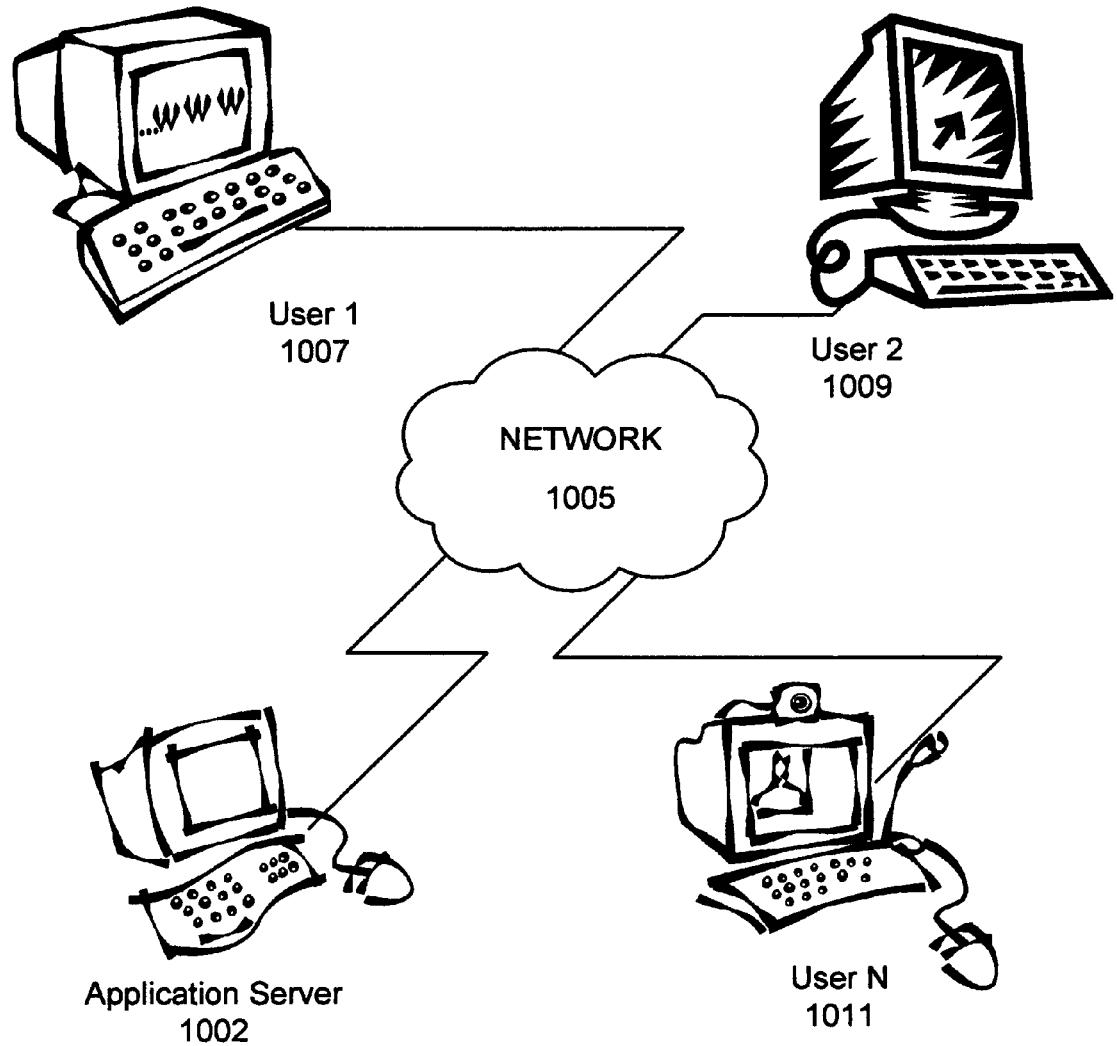
FIG. 10 is an illustration of a data processing system that supports multiple simultaneous users of an Innovation Engines system connected via a network, in accordance with another embodiment of the invention.

FIG. 10 is an illustration of a data processing system that supports multiple simultaneous users of an Innovation Engines system connected via a network 1005, in accordance with another embodiment of the invention. Each potential user 1007, 1009, or 1011 has a data processing system as described in FIG. 8. Assuming that the I-E application is running on a shared application server 1002 to which all users have access, the users can be simultaneously utilizing various portions of I-E software. Examples of simultaneous user tasks are coordinators, workflow users, independent users, trainees or managers getting reports from the workflow database, and equivalents.

Figure 11:
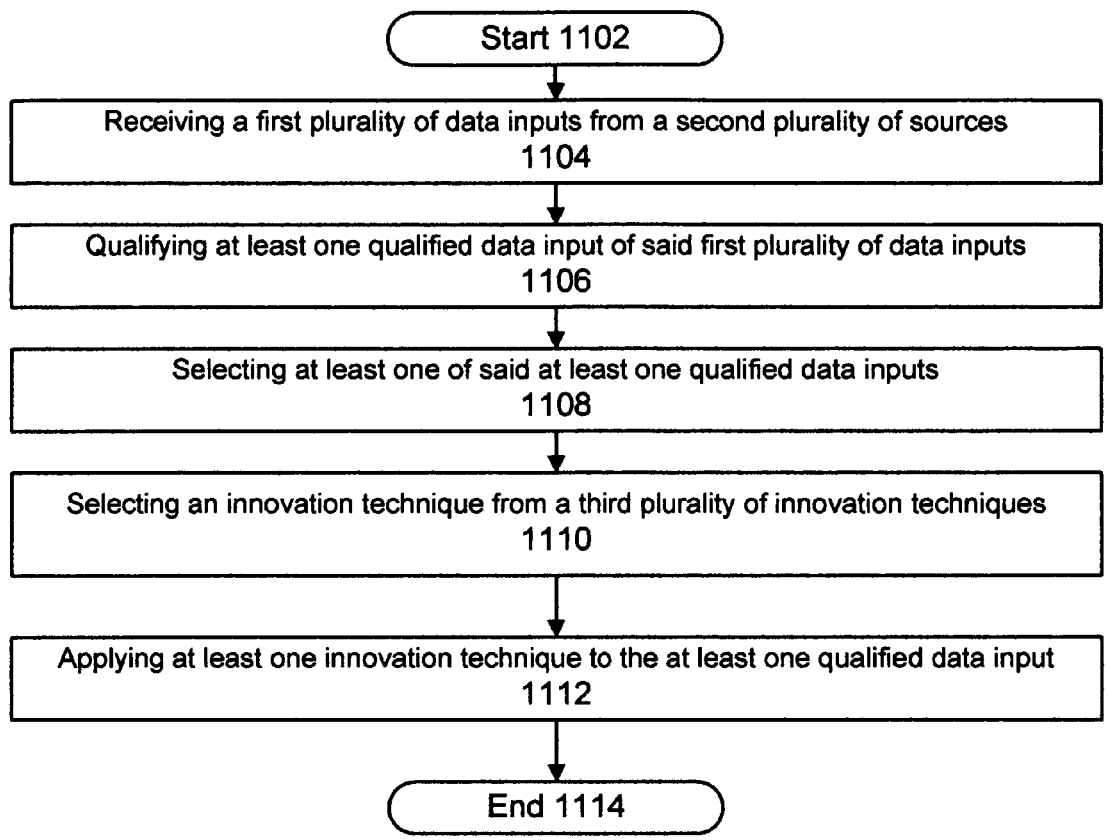
FIG. 11 represents a flowchart to innovate using a data processing system, in accordance with one embodiment of the invention.

FIG. 11 represents a flowchart to innovate using a data processing system, in accordance with one embodiment of the invention. The method begins in operation 1102. Operation 1104 is next and includes receiving a first plurality of data inputs from a second plurality of sources. Operation 1106 is next and includes qualifying at least one qualified data input of said first plurality of data inputs. Operation 1108 is next and includes selecting at least one of said qualified data input (s). Operation 1110 is next and includes selecting at least one innovation technique from a third plurality of innovation techniques. Operation 1112 is next and includes applying said at least one innovation technique to said at least one qualified data input to identify one or more potential solutions. The method ends in operation 1114.

Figure 12:
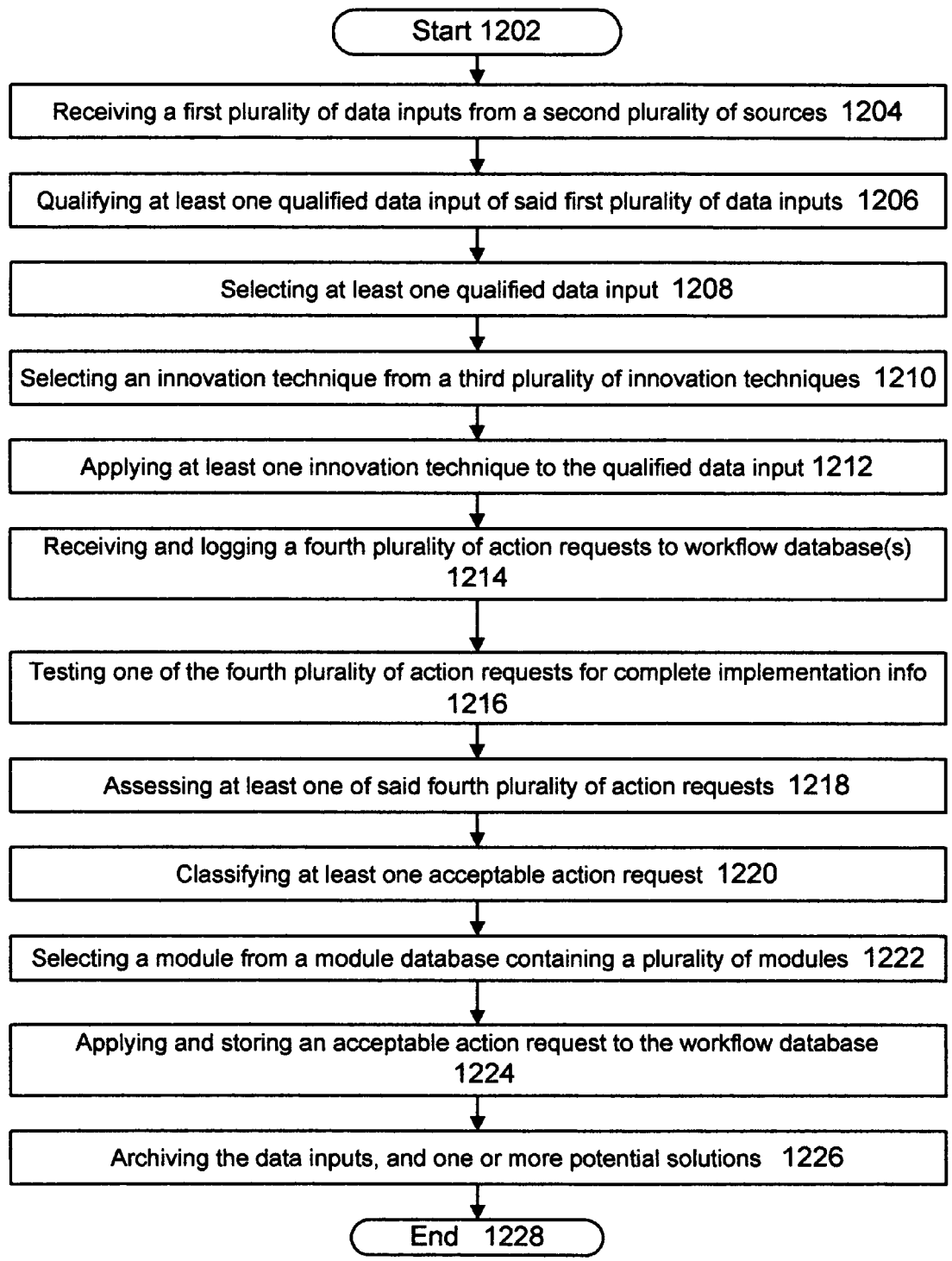
FIG. 12 represents a flowchart to innovate using a data processing system, in accordance with another embodiment of the invention.

FIG. 12 represents a flowchart to innovate using a data processing system, in accordance with another embodiment of the invention. The method begins in operation 1202. Operation 1204 is next and includes receiving a first plurality of data inputs from a second plurality of sources. Operation 1206 is next and includes qualifying at least one qualified data input of said first plurality of data inputs. Operation 1208 is next and includes selecting at least one of said at least one qualified data inputs. Operation 1210 is next and includes selecting at least one innovation technique from a third plurality of innovation techniques. Operation 1212 is next and includes applying said at least one innovation technique to said at least one qualified data input to identify one or more potential solutions. Operation 1214 is next and includes receiving and logging a fourth plurality of action requests to at least one workflow database. Operation 1216 is next and includes testing at least one of said fourth plurality of action requests for complete implementation information, and obtaining at least one additional action request to said at least one workflow database. Operation 1218 is next and includes assessing at least one of said fourth plurality of action requests to identify at least one acceptable action request to be assigned. Operation 1220 is next and includes classifying said at least one acceptable action request. Operation 1222 is next and includes selecting at least one module from a module database containing a plurality of modules to select said at least one acceptable action request. Operation 1224 is next and includes applying and storing said at least one acceptable action request to said workflow database. Operation 1226 is next and includes archiving said plurality of data inputs, and one or more potential solutions. In an alternative embodiment operation 1226 includes archiving said plurality of data inputs, a priority of said plurality of data inputs, an acceptance test, a second test, one or more potential solutions, and said selected solution. The method ends in operation 1228.

FIG. 13 represents a flowchart to innovate using a data processing system, in accordance with another embodiment of the invention. The method begins in operation 1302. Operation 1304 is next and includes logging, assessing, and correcting at least one action request input submitted via a data processing standard format. External inputs can be normalized to a database. An Innovation Coordinator can select further action, such as return for more information, hold, archive, return or reject or proceed. Operation 1306 is next and includes selecting at least one action request input and decide on at least one goal classification, as shown in Table 2. Operation 1308 is next and includes selecting at least one technique module from a plurality of technique modules to apply and record at least one technique module output. This can include determining and selecting and entering a specific problem goal. This is the I-E situation goal classification that automatically guides user(s) to best solution domain and modules. Using such process modules produces one or more innovation solutions and options. Operation 1310 is next and includes selecting at least one test module and applying and recording at least one test module output. Operation 1312 is next and includes determining satisfaction with the test module output, repeating operations 1308, 1310 and 1312 if satisfaction is not determined, and when satisfaction is determined, going to operation 1314 which includes accepting the test module output, where the actionable results 106 are recommended for development or actionable results. The method ends in operation 1316.

Figure 14:
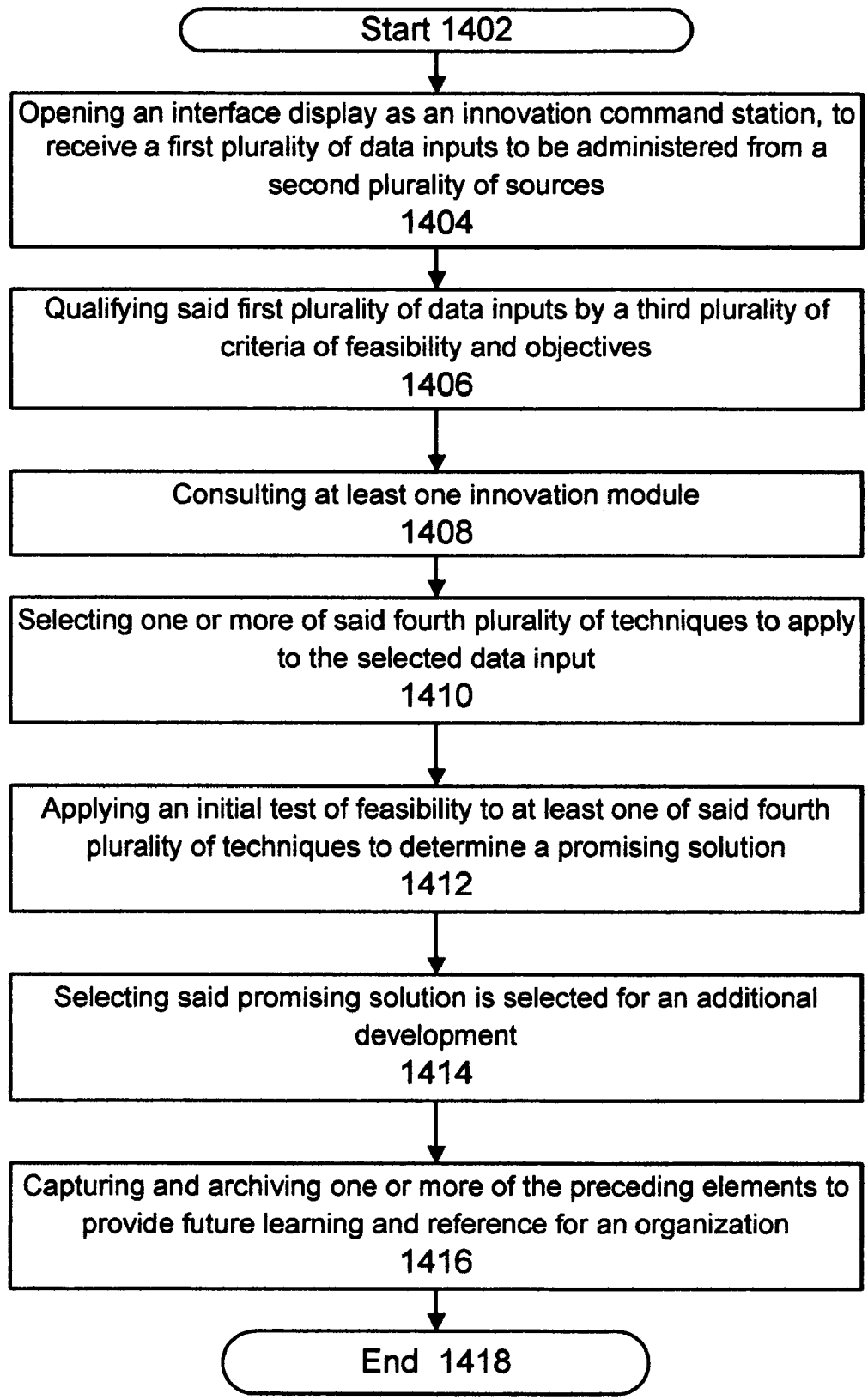
FIG. 14 represents a flowchart to innovate using a data processing system, in accordance with another embodiment of the invention.

FIG. 14 represents a flowchart to innovate using a data processing system, in accordance with another embodiment of the invention. The method begins in operation 1402. Operation 1404 is next and includes opening an interface display as an innovation command station, to receive a first plurality of data inputs to be administered from a second plurality of sources. Operation 1406 is next and includes qualifying the first plurality of data inputs by a third plurality of criteria of feasibility and objectives, wherein one or more of the first plurality of qualified data inputs are selected as candidates for innovation development. Operation 1408 is next and includes consulting at least one innovation module, which appropriately matches the problem classification, wherein the innovation module carries a fourth plurality of related techniques to find innovation solutions. Operation 1410 is next and includes selecting one or more of the fourth plurality of techniques to apply to the selected data input. Operation 1412 is next and includes applying an initial test of feasibility to at least one of the fourth plurality of techniques to determine a promising solution. Operation 1414 is next and includes selecting the promising solution is selected for an additional development. Operation 1416 is next and includes capturing and archiving one or more of the preceding elements to provide future learning and reference for an organization. The method ends in operation 1418.

The exemplary embodiments described herein are for purposes of illustration and are not intended to be limiting. Therefore, those skilled in the art will recognize that other embodiments could be practiced without departing from the scope and spirit of the claims set forth below.

The invention claimed is:

1. A system of managing innovation, comprising:
 a computer processor; and
 computer accessible memory operably linked to the processor, wherein the memory stores instructions directing the at least one computer processor to perform the steps of:
  receiving data input from one or more sources;
  qualifying the data inputs, wherein the qualifying of the data inputs comprises:
   assigning a time to complete requirement factor to the data;
   assigning a resource impact factor to the data;
   assigning a serendipity factor to the data;
   assigning a feasibility factor to the data;
   assigning an overall worthiness of direction factor to the data;
   calculating a potential importance factor to the data by summing the time to complete factor, the resource impact factor, serendipity factor, feasibility factor, and overall worthiness of direction factor;
   ranking the potential importance factor of each of the input data; and abandoning any potential solution if the solution fails to exceed a predetermined potential importance factor threshold value;

selecting at least one of the qualified data inputs;

selecting at least one innovation technique, wherein the at least one innovation technique is selected from the group of categories comprising solution finding, direction finding, strategic development, and intelligence and communication;

applying the at least one innovation technique to the selected qualified data input;

determining potential solutions based on the result of applying the at least one innovation technique to the selected qualified data input;

testing the potential solutions by applying (a) a first test to determine any further development possibilities or development problems and (b) a second test comprising: assigning at least one factor to the potential solution, determining a numeric rating for the at least one factor, calculating an average of the numeric ratings for each factor, and ranking the solutions based on the calculated numeric average of the factors of the potential solutions;

displaying the second test in an analog graph, wherein the analog graph comprises a meter needle that is positioned to the left or right of a scale indicating a value;

selecting at least one of the potential solutions based on the results of the testing of the potential solutions;

storing the selected potential solutions in a database; and implementing the selected potential solutions.

* * * * *